(12) United States Patent
Szor

(10) Patent No.: US 7,284,273 B1
(45) Date of Patent: Oct. 16, 2007

(54) FUZZY SCANNING SYSTEM AND METHOD

(75) Inventor: Peter Szor, Northridge, CA (US)

(73) Assignee: Symantec Corporation, Cupertino, CA (US)

(\*) Notice: Subject to any disclaimer, the term of this patent is extended or adjusted under 35 U.S.C. 154(b) by 915 days.

(21) Appl. No.: 10/448,567

(22) Filed: May 29, 2003

(51) Int. Cl.
*G06F 11/00* (2006.01)
(52) U.S. Cl. .............. 726/24; 726/22; 726/23
(58) Field of Classification Search ........... 726/22, 726/23, 24
See application file for complete search history.

(56) References Cited

U.S. PATENT DOCUMENTS

| | | | |
|---|---|---|---|
| 5,440,723 A | * | 8/1995 | Arnold et al. .......... 714/2 |
| 5,826,013 A | * | 10/1998 | Nachenberg .......... 726/22 |
| 6,683,639 B2 | | 1/2004 | Driessen-Olde Scheper et al. ........ 347/238 |

OTHER PUBLICATIONS

Szor et al., U.S. Appl. No. 10/864,109, filed Jun. 8, 2004, entitled "Filtered Antivirus Scanning".
Szor, U.S. Appl. No. 10/914,962, filed Aug. 9, 2004, entitled "Cache Scanning System and Method".

\* cited by examiner

*Primary Examiner*—Giberto Barrón, Jr.
*Assistant Examiner*—Ellen Tran
(74) *Attorney, Agent, or Firm*—Gunnison, McKay & Hodgson, L.L.P.; Serge J. Hodgson

(57) ABSTRACT

A method includes randomly mutating a virus definition file on a first host computer system to create a first mutated virus definition file, and randomly mutating the virus definition file on a second host computer system to create a second mutated virus definition file, the second mutated virus definition file being different than the first mutated virus definition file. Because of the differences between the first and second mutated virus definition files, a new unknown virus variant undetected on the first host computer system is detected and collected on the second host computer system thus preventing the unknown virus variant from becoming widespread.

27 Claims, 4 Drawing Sheets

FUZZY SCANNING SYSTEM AND METHOD

BACKGROUND OF THE INVENTION

1. Field of the Invention

The present invention relates to the protection of computer systems. More particularly, the present invention relates to a virus detection system and method.

2. Description of the Related Art

Anti-viral string scanning software looks for known viral scan strings, i.e., known strings of bytes, also known as virus signatures, to identify known viruses. Because of this, anti-viral string scanning software, hereinafter referred to as a string scanner, typically will detect only known viruses and the virus definition file used by the string scanner must be updated regularly.

Virus definition files typically include known virus strings and properties, e.g., flags, associated with the known virus strings. More particularly, some string scanners use mismatch values of the number of allowed mismatches assigned to particular known virus strings to allow identification of variants of a known virus.

A mismatch is an amount of information, e.g., a byte of information, that can be different between the known virus string and the scanned file string while still resulting in a conclusion that the scanned file string is a virus. A mismatch value if the number of allowed mismatches.

To illustrate, an exemplary known virus string is:
ABCDEFG

If the mismatch value is one, the following strings would be detected under the same virus name:
ZBCDEFG
AZCDEFG
ABZDEFG
ABCZEFG
ABCDZFG
ABCDEZG
ABCDEFZ Thus, using mismatches, variants of known viruses are identified.

Because the virus definition updates are readily available, the virus definition file used by the string scanner is easily obtainable by virus writers. Thus, virus writers have the opportunity to create viruses and to test their viruses in the very same environment as other computer systems use. This allows the virus writer to verify that their virus is undetected by the string scanner even when the most current virus definition file is used.

To illustrate, a virus writer creates a virus. The virus writer then scans the virus with the string scanner. If the string scanner detects the virus as a threat, then the virus writer simply further modifies the virus. The virus writer again scans the now modified virus with the string scanner. This process is repeated until the string scanner does not detect the virus as a threat, i.e., the virus is not identified as a known virus or a variant of a known virus.

Once the string scanner does not detect the virus as a threat, the virus writer is free to release the virus to the wild confident that the virus will not be detected as a threat on other computer systems running the same string scanner. Thus, the virus becomes widespread before a virus definition update for the virus is generally available.

SUMMARY OF THE INVENTION

In accordance with one embodiment of the present invention, a method includes randomly mutating a virus definition file on a first host computer system to create a first mutated virus definition file, and randomly mutating the virus definition file on a second host computer system to create a second mutated virus definition file, the second mutated virus definition file being different than the first mutated virus definition file.

Thus, a new unknown virus variant created by a virus writer on the first host computer system may not be detected by a fuzzy scanning application using the first mutated virus definition file on the first host computer system. However, due to the randomness in virus definition file mutation, the fuzzy scanning application using the second mutated virus definition file on the second host computer system may detect different unknown virus variant than the first host computer system.

Accordingly, the new unknown virus variant undetected by the fuzzy scanning application on the first host computer system is detected and collected by the fuzzy scanning application on the second host computer system when the unknown virus variant is introduced on the second host computer system. In this manner, unknown virus variants are quickly detected and collected thus preventing the unknown virus variants from becoming widespread.

Embodiments in accordance with the present invention are best understood by reference to the following detailed description when read in conjunction with the accompanying drawings.

BRIEF DESCRIPTION OF THE DRAWING

Common reference numerals are used throughout the drawings and detailed description to indicate like elements.

DETAILED DESCRIPTION

Figure 1:
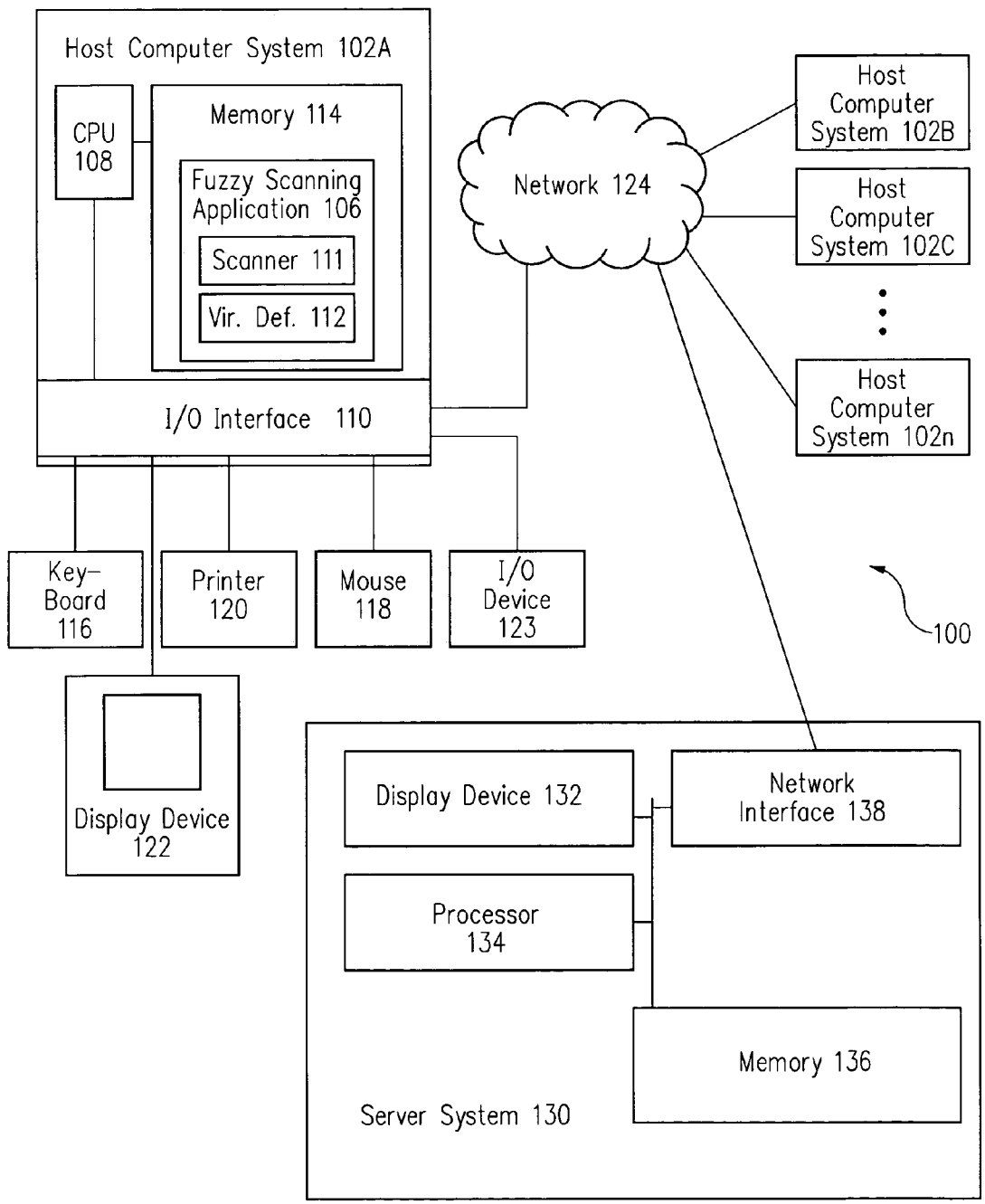
FIG. 1 is a diagram of a client-server system that includes a fuzzy scanning application executing on a host computer system in accordance with one embodiment of the present invention.

In accordance with one embodiment of the present invention, referring to FIG. 1, a method includes randomly mutating a virus definition file 112 on a first host computer system 102A to create a first mutated virus definition file, and randomly mutating virus definition file 112 on a second host computer system 102B to create a second mutated virus definition file, the second mutated virus definition file being different than the first mutated virus definition file.

Thus, a new unknown virus variant created by a virus writer on first host computer system 102A may not be detected by a fuzzy scanning application 106 executing on first host computer system 102A. However, due to the randomness in virus definition file mutation, fuzzy scanning application 106 executing on second host computer system 102B may detect different unknown virus variant than first host computer system 102A.

Accordingly, the new unknown virus variant undetected by fuzzy scanning application 106 executing on first host computer system 102A is detected and collected by fuzzy scanning application 106 executing on second host computer system 102B when the unknown virus variant is introduced on second host computer system 102B. In this manner, unknown virus variants are quickly detected and collected thus preventing the unknown virus variant from becoming widespread.

More particularly, FIG. 1 is a diagram of a client-server system 100 that includes a fuzzy scanning application 106 executing on a host computer system 102A, e.g., a first computer system, in accordance with one embodiment of the present invention. Host computer system 102A can be a stand-alone system, such as a personal computer or workstation, as illustrated schematically in FIG. 1 by host computer system 102A. Host computer system 102A can also be part of a client-server configuration 100 that is also illustrated in FIG. 1 in which host computer system 102A interacts with a server system 130 via a network 124, such as the Internet.

Host computer system 102A, sometimes called a client or user device, typically includes a central processing unit (CPU) 108, hereinafter processor 108, an input output (I/O) interface 110, and a memory 114. Host computer system 102A may further include standard devices like a keyboard 116, a mouse 118, a printer 120, and a display device 122, as well as, one or more standard input/output (I/O) devices 123, such as a compact disk (CD) or DVD drive, floppy disk drive, or other digital or waveform port for inputting data to and outputting data from host computer system 102A. In one embodiment, fuzzy scanning application 106 is loaded into host computer system 102A via I/O device 123, such as from a CD, DVD or floppy disk containing fuzzy scanning application 106.

Host computer system 102A is coupled to server system 130 of client-server system 100 by network 124. Server system 130 typically includes a display device 132, a processor 134, a memory 136, and a network interface 138. In one embodiment, as illustrated in FIG. 1, a plurality of host computer systems 102B, 102C, . . . , 102n similar to host computer system 102A are coupled to server system 130 by network 124. The particular type of and configuration of host computer system 102A, host computer systems 102B, 102C . . . 102n, and server system 130 are not essential to this embodiment of the present invention.

Network 124 can be any network or network system that is of interest to a user. In various embodiments, network interface 138 and I/O interface 110 include analog modems, digital modems, or a network interface card.

Fuzzy scanning application 106 is stored in memory 114 of host computer system 102A and executed on host computer system 102A. Fuzzy scanning application 106 includes a scanner 111 and a virus definition file 112. Host computer systems 102B, 102C . . . 102n, and/or server system 130 also include fuzzy scanning applications (not shown for simplicity) similar to fuzzy scanning application 106.

In one embodiment, virus definition file 112 is updated regularly, for example, by downloading over network 124. Virus definition file 112 includes a plurality of virus strings, sometimes called virus signatures or simply strings, of known viruses or other known malicious code. Virus strings are typically 32 to 60 bytes long and are dividable into segments, e.g., into bytes.

In one embodiment, malicious code is defined as any computer program, module, set of modules, or code that enters a computer system without an authorized user's knowledge and/or without an authorized user's consent.

Figure 2:
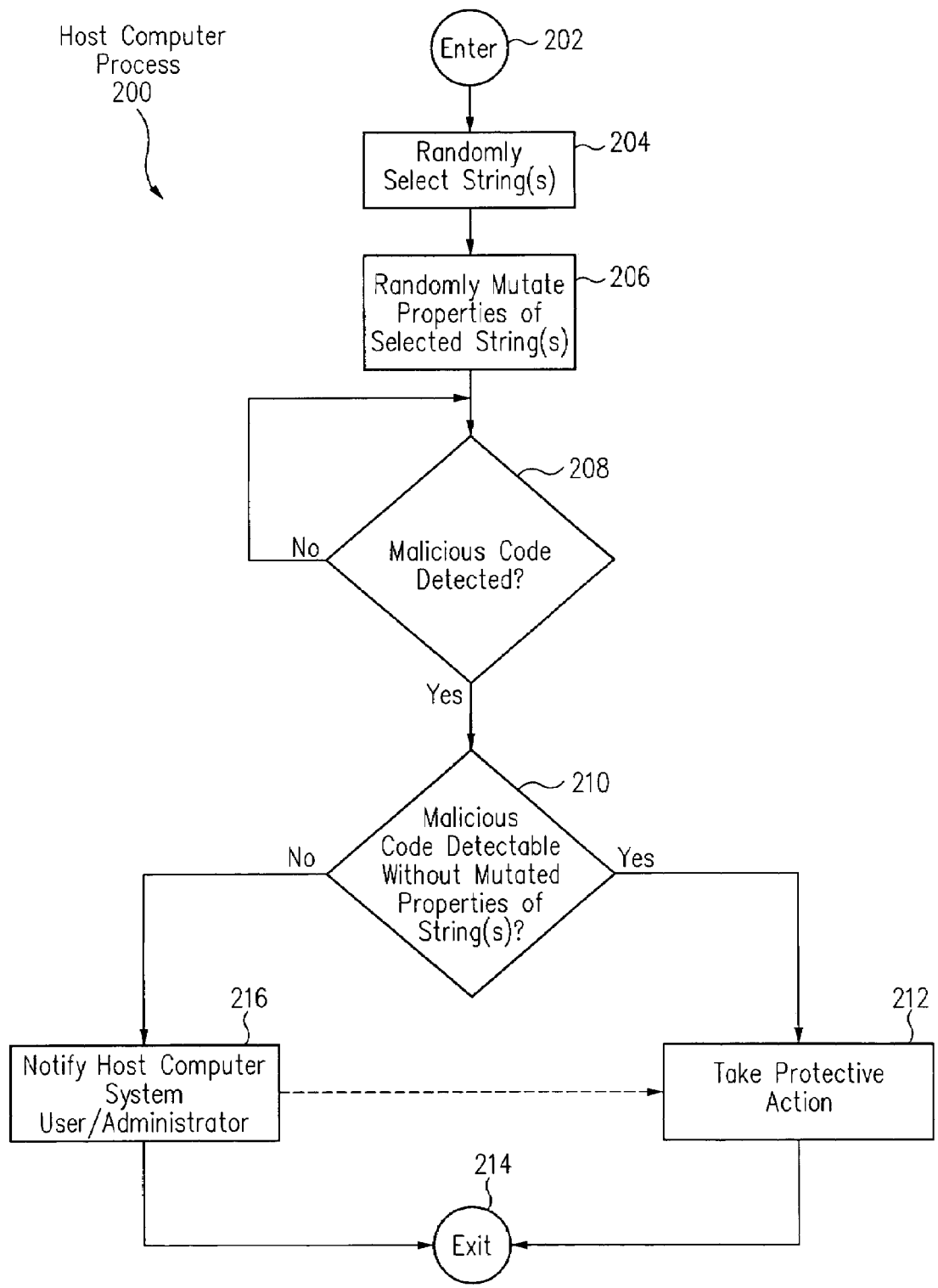
FIG. 2 is a flow diagram of a host computer process in accordance with one embodiment of the present invention.

FIG. 2 is a flow diagram of a host computer process 200 in accordance with one embodiment of the present invention. Referring now to FIGS. 1 and 2 together, execution of fuzzy scanning application 106 by processor 108 results in the operations of host computer process 200 as described below in one embodiment.

In one embodiment, prior to execution of fuzzy scanning application 106, the user of host computer system 102A is asked if the user wants to run an atypical scanner. If the user response is that the user does not want to run an atypical scanner, execution of fuzzy scanning application 106 is prevented. However, if the user response is that the user does want to run an atypical scanner, host computer process 200 is performed as discussed below.

From an enter operation 202, flow moves to a randomly select string(s) operation 204. In randomly select string(s) operation 204, at least one string of virus definition file 112 is randomly selected.

For example, virus definition file 112 includes 500 strings. Five of these 500 strings are randomly selected in randomly select string(s) operation 204 although more or less than five strings are selected in other embodiments.

From randomly select string(s) operation 204, flow moves to a randomly mutate properties of select string(s) operation 206. In randomly mutate properties of select string(s) operation 206, properties of the at least one string of virus definition file 112 selected in randomly select string(s) operation 204 are randomly mutated. In one embodiment, the properties of the at least one string of virus definition file 112 are randomly mutated as virus definition file 112 is loaded into virtual memory. Thus, virus definition file 112 is mutated into a mutated virus definition file.

Because only the properties of the at least one string of virus definition file 112 are randomly mutated and additional strings are not added, the mutated virus definition file does not include new records. Accordingly, the size of the mutated virus definition file is not increased and as a result the speed of scanner 111 is not decreased.

From randomly mutate properties of select string(s) operation 206, flow moves to a malicious code detected check operation 208. In malicious code detected check operation 208, a determination is made as to whether malicious code is detected by fuzzy scanning application 106. Illustratively, scanner 111 of fuzzy scanning application 106 performs an on access and/or on demand scan using the mutated virus definition file created during randomly mutate properties of selected string(s) operation 206.

If a determination is made in malicious code detected check operation 208 that no malicious code is detected, flow remains at malicious code detected check operation 208. Conversely, if a determination is made in malicious code detected check operation 208 that malicious code is detected, flow moves to a malicious code detectable without mutated properties of string(s) check operation 210.

In malicious code detectable without mutated properties of string(s) check operation 210, a determination is made as to whether the malicious code is detectable without the mutated properties of string(s). More particularly, a determination is made as to whether the malicious code is detectable using the original virus definition file 112, i.e., not the mutated virus definition file created in randomly mutate properties of selected string(s) operation 206.

If a determination is made in malicious code detectable without mutated properties of string(s) check operation 210 that the malicious code is detectable without the mutated properties of string(s), flow moves to a take protective action operation 212.

In this event, a known virus or known virus variant has been detected. A known virus is a virus that has a string that matches a string of virus definition file 112 without mutation, i.e., that matches the original virus definition file 112. A known virus variant is a virus that is slightly different, e.g., different by a few bytes, than a known virus and that has a string that matches a string of virus definition file 112 without mutation but using the mismatches assigned to the string in virus definition file 112. More generally, a known virus and a known virus variant, sometimes called known malicious code, are viruses that a detectable using the original and unmutated virus definition file 112.

Because a known virus or known virus variant has been detected, protective action is taken in take protective action operation 212 to protect host computer system 102A. Protective action is taken using any one of a number of techniques well known to those of skill in the art and the particular technique used is not essential to the present invention. From take protective action operation 212, flow moves to and exits at an exit operation 214 or returns to malicious code detected check operation 208.

Accordingly, fuzzy scanning application 106 detects known viruses and known virus variant on all computer systems, e.g., computer systems 102A, 102B, 102C . . . 102n in the identical manner.

However, returning to malicious code detectable without mutated properties of strings check operation 210, if a determination is made in malicious code detectable without mutated properties of string(s) check operation 210 that the malicious code is not detectable without the mutated properties of string(s), flow moves to a notify host computer system user/administrator operation 216.

In this event, unknown malicious code, e.g., an unknown virus, unknown virus variant or unknown worm, has been detected. In one embodiment, unknown malicious code is malicious code that has a string that does not match a string of virus definition file 112 without mutation and that does not match a string of virus definition file 112 without mutation and using the mismatches assigned to the string in virus definition file 112. More generally, unknown malicious code is malicious code that is undetectable using the original and unmutated virus definition file 112.

Because unknown malicious code has been detected, in notify host computer system user/administrator operation 216, the user of host computer system 102A and/or the administrator are notified that unknown malicious code is detected on host computer system 102A. The user and/or administrator can be notified using any one of a number of techniques, e.g., by using a pop up window, by writing to a file and/or otherwise by logging the event.

In one embodiment, in notify host computer system user/administrator operation 216, the user and/or the administrator are asked to submit a sample of the unknown malicious code to a virus collection center for further analysis, e.g., to create a new updated virus definition file for the unknown malicious code. In one embodiment, fuzzy scanning application 106 is used as part of the IBM immune system and collects viruses at client sites.

In one embodiment, from notify host computer system user/administrator operation 216, flow moves to and exits at exit operation 214 or returns to malicious code detected check operation 208. In another embodiment, flow moves to take protective action operation 212, which is performed as discussed above.

Accordingly, as set forth above, fuzzy scanning application 106 detects known malicious code on all host computer systems 102A, 102B, 102C . . . 102n in an identical manner. However, fuzzy scanning application 106 detects unknown malicious code on each computer system, e.g., computer systems 102A, 102B, 102C . . . 102n, in a randomly different manner.

Thus, as described further below in reference to FIGS. 5, 6, 7, a new unknown virus variant created by a virus writer on a first host computer system may not be detected by fuzzy scanning application 106 executing on the first host computer system. However, due to the randomness in string selection and string property mutation, fuzzy scanning application 106 executing on a second host computer system may detect different unknown virus variant than the first host computer system.

Accordingly, the new unknown virus variant undetected by fuzzy scanning application 106 executing on the first host computer system is detected and collected by fuzzy scanning application 106 executing on a second host computer system when the unknown virus variant is introduced on the second host computer system. In this manner, unknown virus variants are quickly detected and collected thus preventing the unknown virus variant from becoming widespread.

Figures 3, 4:
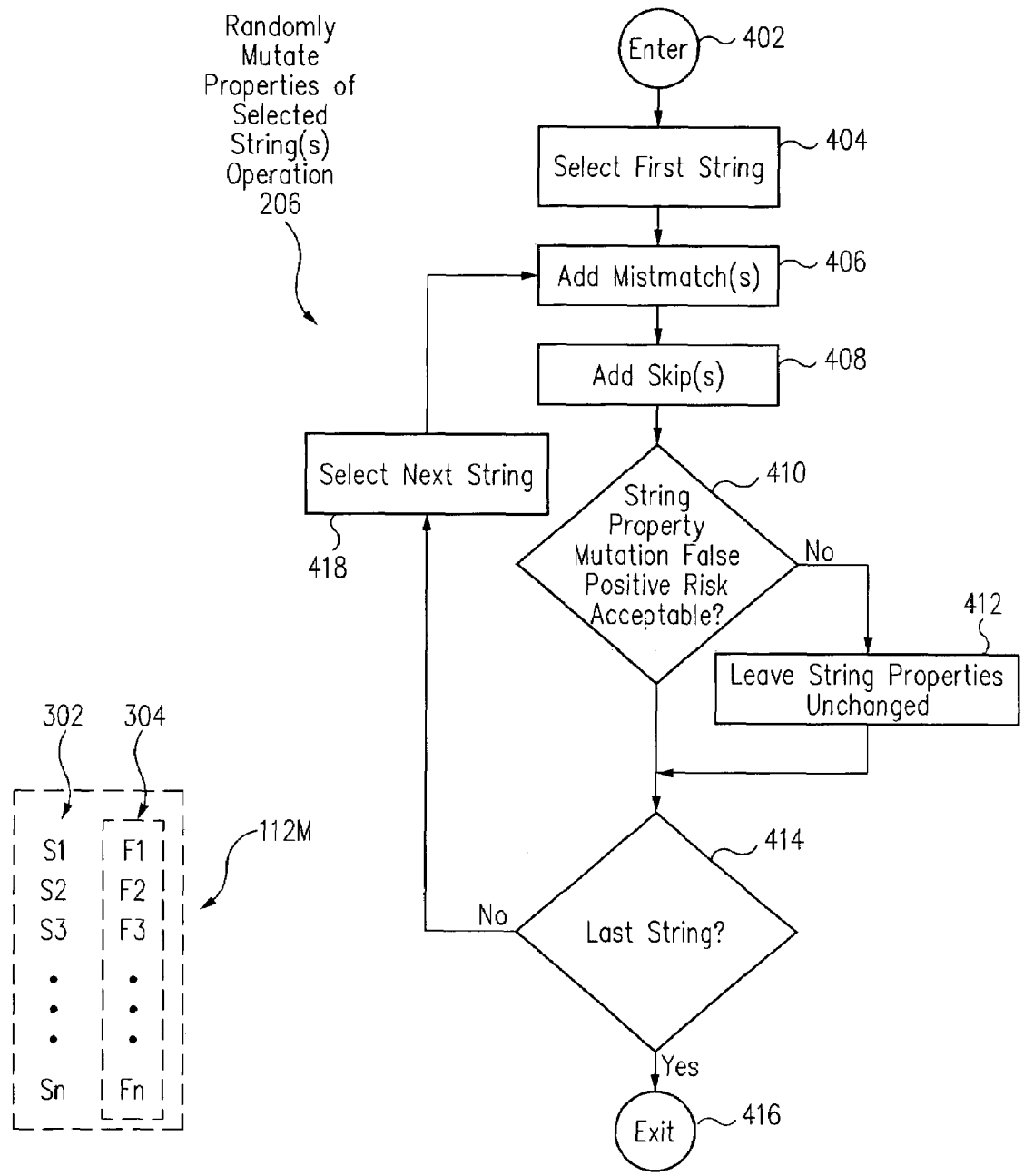
FIG. 3 is a mutated virus definition file created by the fuzzy scanning application in accordance with one embodiment of the present invention.
FIG. 4 is a flow diagram of a randomly mutate properties of selected string(s) operation of FIG. 2 in accordance with one embodiment of the present invention.

FIG. 3 is a mutated virus definition file 112M created by fuzzy scanning application 106 in accordance with one embodiment of the present invention. Referring now to FIG. 3, mutated virus definition file 112M include a set 302 of strings S1, S2, S3 . . . Sn and a set 304 of flags. F1, F2, F3 . . . Fn associated with strings S1, S2, S3 . . . Sn. To illustrate, a first string S1 has an associated first flag F1. The other strings S2, S3 . . . Sn have associated flags F2, F3 . . . Fn, respectively, in a similar manner.

In one embodiment, strings S1, S2, S3 . . . Sn are known strings of bytes, also known as known virus signatures. Illustratively, strings S1, S2, S3 . . . Sn are downloaded as part of virus definition file 112 (FIG. 1).

Further, flags F1, F2, F3 . . . Fn, sometimes called mutated flags, are property associated with strings S1, S2, S3 . . . Sn. In accordance with the embodiment illustrated in FIG. 3, randomly mutate properties of selected string(s) operation 206 of FIG. 2 is performed by randomly mutating one or more flags of virus definition file 112 to create mutated flags F1, F2, F3 . . . Fn associated with strings S1, S2, S3 . . . Sn.

FIG. 4 is a flow diagram of randomly mutate properties of selected string(s) operation 206 of FIG. 2 in accordance with one embodiment of the present invention. Referring now to FIGS. 2, 3 and 4 together, from an enter operation 402, flow moves to a select first string operation 404. In select first string operation 404, the first string is selected for mutation of the string's properties.

In one embodiment, the first string was randomly selected in randomly select strings operation 204. For example, assume strings S1 and S3 of mutated virus definition file 112M were selected during randomly select string(s) operation 204. Thus, string S1 is selected during select first string operation 404.

In another embodiment, instead of randomly selecting all strings in randomly select string(s) operation 204 and then performing operation 206, each string is randomly selected and the properties of the randomly selected string are mutated before another string is randomly selected. For example, operation 204 is not performed and the strings are randomly selected in operations 404 and 418.

From select first string operation 404, flow moves to an add mismatch(s) operation 406. In add mismatch(s) operation 406, a random amount of additional mismatches is added to the flag associated with the string selected during select first string operation 404 (the flag is thus sometimes said to be mutated).

In one embodiment, a mismatch is an amount of information, e.g., a byte of information, that can be different between the selected string of the mutated virus definition file and the scanned file string while still resulting in a conclusion that the scanned file string is malicious code. A mismatch value is the number of allowed mismatches.

To illustrate, for the following selected string of the virus definition file:

E8000000005E0102030EB50607080, if a mismatch is one character and the mismatch value if two, the following strings are detected under the virus name associated with the selected string:

E8000000005D0102130EB50607080
E8000000025E0102030EB50607081

For example, at least one additional mismatch is added, e.g., the mismatch value of the flag associated with the string selected during select first string operation 404 is incremented by at least one. To continue with the above example, at least one additional mismatch is added to create flag F1, e.g., the mismatch value of flag F1 is incremented by at least one compared to the respective flag of virus definition file 112.

From add mismatch(s) operation 406, flow moves in an add skip(s) operation 408. In add skip(s) operation 408, a random amount of additional skips is added to the flag associated with the string selected during select first string operation 404.

In one embodiment, a skip, e.g., a NOP like or do nothing instruction, is an amount of information, e.g., a byte of information, that can be inserted into the scanned file string, e.g., by a virus writer, while still resulting in a conclusion that the scanned file string is malicious code. A skip value if the number of allowed skips.

Illustratively, if the skip value is n and a skip is one byte, 1, 2, . . . and n number of bytes are skipped in the scanned file string and the next position in the scanned file string is compared to the selected string of the mutated virus definition file.

To illustrate, for the following selected string of the virus definition file:

E8000000005E0102030EB50607080, if a skip is two character and the skip value if four, the following strings are detected under the virus name associated with the selected string:

E800000000905E0102030EB50607080
E80000000090905E0102030EB50607080
E8000000009090905E0102030EB50607080
E800000000909090905E0102030EB50607080

In one embodiment, % n marks are inserted into the selected string of the mutated virus definition file, where n is the skip value. In accordance with this embodiment, the selected string of the mutated virus definition file for the above illustration is represented as

E800000000%45E0102030EB50607080

The n number of skips are inserted at random positions within the selected string of the virus definition file in one embodiment, for example, using the % n marks.

In one embodiment, at least one additional skip is added, e.g., the skip value of the flag associated with the string selected during select first string operation 404 is incremented by at least one. To continue with the above example, at least one additional skip is added to create flag F1, e.g., the skip value of flag F1 is incremented by at least one compared to the respective flag of virus definition file 112.

As discussed above, in operations 406 and 408, a random amount of additional mismatches and skips are added to the flag. In one embodiment, the random amount of additional mismatches and skips is based upon the detected network address or network adapter of the particular host computer system. However, the random amount of additional mismatches and skips are based upon other factors in other embodiments. For example, the random amount of additional mismatches and skips are based upon the particular week, day, the date of virus definition file 112, or other factor.

Further, although performance of both operations 406 and 408 is discussed, in another embodiment, either add mismatch(s) operation 406 or add skip(s) operation 408 is performed, but not both.

From add skip(s) operation 408 (or from add mismatch(s) operation 406 when add skip(s) operation 408 is not perform), flow moves to a string property mutation false positive risk acceptable check operation 410. In string property mutation false positive risk acceptable check operation 410, a determination is made as to whether the mutated string properties, i.e., the string properties as mutated in operations 406 and 408, have an acceptable false positive risk.

A false positive occurs when a match between the string having mutated properties and the scanned file string results in a conclusion that the scanned file string is malicious code, when in fact the scanned file string does not contain malicious code.

For example, for a string, e.g., string S1, that is 30 bytes long, a maximum of four mismatches, e.g., four mismatches of one byte each, are allowed and results in an acceptable string property mutation false positive risk. Conversely, for a string that is 30 bytes long, five of more mismatches are not allowed and results in an unacceptable string property mutation false positive risk, i.e., the risk of false positives is unacceptably high.

Further, for strings longer than 30 bytes, eight or nine mismatches are allowed and result in an acceptable string property mutation false positive risk in one embodiment. In one embodiment, three mismatches are allowed and result in an acceptable string property mutation false positive risk for a PAM32 string.

Although specific examples of string property mutations having acceptable false positive risks are set forth above, in light of this disclosure, those of skill in the art will understand that other string property mutations having acceptable false positive risks are possible.

If a determination is made in string property mutation false positive risk acceptable check operation 410 that the mutated string properties do not have an acceptable false positive risk, flow moves to a leave string properties unmutated operation 412. In leave string properties unmutated operation 412, the string properties are left unmutated, i.e., are left in the original form as in original virus definition file 112.

In accordance with one embodiment, the flag associated with the string is left in its original form, i.e., additional mismatches and/or skips of operations 406 and 408 are not added to the flag. By leaving the string properties unmutated, unacceptable false positive risks are not assumed. From leave string properties unmutated operation 412, flow moves to a last string check operation 414.

In contrast, if a determination is made in string property mutation false positive risk acceptable check operation 410 that the mutated string properties do have an acceptable false positive risk, flow moves directly to last string check operation 414.

In last string check operation 414, a determination is made as to whether the present string is the last string selected in randomly select string(s) operation 204. If a determination is made that the present string is the last string selected in randomly select string(s) operation 204, flow moves to and exits at an exit operation 416 thus returning to malicious code detected check operation 208 of FIG. 2. In contrast, if a determination is made that the present string is not the last string selected in randomly select string(s) operation 204, flow moves to a select next string to be mutated operation 418.

In select next string to be mutated operation 418, the next string, which was selected in randomly select strings operation 204, is selected to be the present string to have the string's properties mutated. To continue with the above illustration where strings S1 and S3 were randomly selected in operation 204, string S3 is selected as the next string in operation 418. Operations 406, 408, 410, 414 (and sometimes 412) are performed on this newly selected string.

Operations 418, 406, 408, 410, and 414 (and sometimes 412) are repeated until a determination is made in last string check operation 414 that the present string is the last string selected in randomly select string(s) operation 204.

Figure 5:
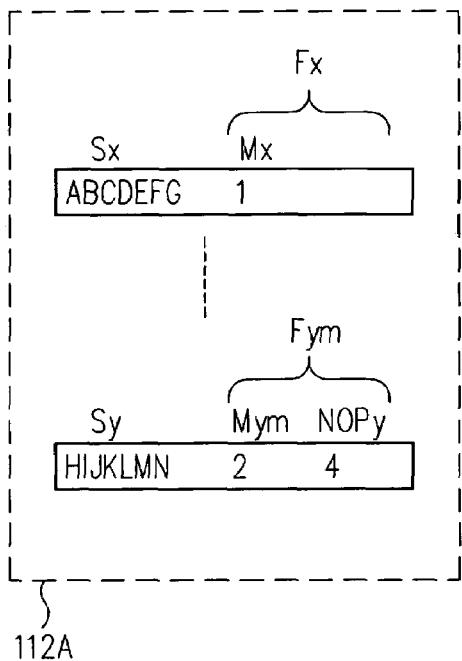
FIGS. 5 and 6 are mutated virus definition files resulting from execution of the fuzzy scanning application on first and second host computer systems in accordance with one embodiment of the present invention.
Figure 6:
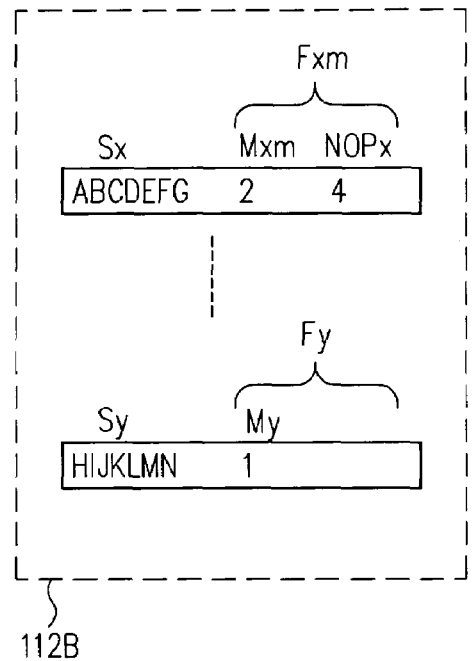

FIGS. 5 and 6 are mutated virus definition files 112A, 112B resulting from execution of fuzzy scanning application 106 on first and second host computer systems 102A, 102B (FIG. 1), respectively, in accordance with one embodiment of the present invention. More particularly, performance of operations 204 and 206 (FIG. 2) create mutated virus definition file 112A, 112B.

Referring initially to FIGS. 2 and 5, string Sy of mutated virus definition file 112A is randomly selected in randomly select string(s) operation 204. String Sy is the string HIJKLMN.

A mutated flag Fym associated with string Sy is created during randomly mutated properties of selected string(s) operation 206. Specifically, mutated flag Fym includes a mismatch value Mym equal to two and a skip value NOPy equal to four. Accordingly, mutated virus definition file 112A allows two mismatches and four skips into string Sy.

Further, string Sx of mutated virus definition file 112A is not randomly selected in randomly select string(s) operation 204. An original flag Fx associated with string Sx is thus left unchanged during randomly mutated properties of selected string(s) operation 206. Specifically, original flag Fx from original virus definition file 112 is left unchanged and include a mismatch value Mx equal to one. Accordingly, mutated virus definition file 112A allows a single mismatch into string Sx. String Sx is the string ABCDEFG.

Referring now to FIGS. 2 and 6, string Sx of mutated virus definition file 112B is randomly selected in randomly select string(s) operation 204. String Sx is the string ABCDEFG.

A mutated flag Fxm associated with string Sx is created during randomly mutated properties of selected string(s) operation 206. Specifically, mutated flag Fxm includes a mismatch value Mxm equal to two and a skip value NOPx equal to four. Accordingly, mutated virus definition file 112B allows two mismatches and four skips into string Sx.

Further, string Sy of mutated virus definition file 112B is not randomly selected in randomly select string(s) operation 204. An original flag Fy associated with string Sy is thus left unchanged during randomly mutated properties of selected string(s) operation 206. Specifically, original flag Fy from original virus definition file 112 is left unchanged and include a mismatch value My equal to one. Accordingly, mutated virus definition file 112B allows a single mismatch into string Sy. String Sy is the string HIJKLMN.

Figure 7:
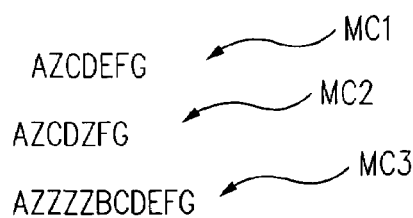
FIG. 7 illustrates three exemplary malicious codes.

FIG. 7 illustrates three exemplary malicious codes MC1, MC2, and MC3, e.g., malicious scanned file strings. Referring now to FIGS. 2, 5, 6 and 7 together, malicious code MC1 is a known virus variant. Specifically, malicious code MC1 is the string Sx but including a single mismatch.

As discussed above, mutated virus definition files 112A, 112B detect malicious code having string Sx and allow one and four mismatches, respectively. Thus, malicious code MC1 is detected using mutated virus definition file 112A and 112B, i.e., on the first and second host computer systems in malicious code detected check operation 208.

From malicious code detected check operation 208, a determination is made that malicious code MC1 is detectable without mutated properties of strings in malicious code detectable without mutated properties of strings check operation 210. Specifically, the original virus definition file 112 detected malicious code having string Sx and allowed one mismatch. Because malicious code MC1 is a known virus variant, flow moves to take protective action 212, which is performed as discussed above. This example illustrates how fuzzy scanning application 106 detects the same set of known viruses and known virus variants on all host computer systems 102A, 102B, 102C . . . 102n in an identical manner in accordance with one embodiment.

In contrast, malicious code MC2 is an unknown virus variant. Specifically, malicious code MC2 is the string Sx but including two mismatches. As discussed above, mutated virus definition files 112A, 112B detect malicious code having string Sx and allow one and four mismatches, respectively. Thus, malicious code MC2 is undetected using mutated virus definition file 112A, i.e., on the first host computer systems.

Accordingly, a virus writer who created and tested malicious code MC2 using the first host computer system including mutated virus definition file 112A will correctly determine that malicious code MC2 is undetectable on the first host computer system. Further, because malicious code MC2 is undetected on the first host computer system, the virus writer may draw the conclusion that malicious code MC2 will be undetectable on all host computer systems executing fuzzy scanning application 106. Thus, the virus writer releases malicious code MC2 into the wild fully expecting malicious code MC2 to become widespread.

However, as malicious code MC2 infects the second host computer system have mutated virus definition file 112B, malicious code MC2 is detected in malicious code detected check operation 208 on the second host computer system. Accordingly, flow moves to malicious code detectable without mutated properties of strings check operation 210.

In this example, a determination is made that malicious code MC2 would not be detectable absent the mutated properties of string Sx in malicious code detectable without mutated properties of strings check operation 210. Specifically, the original virus definition file 112 detected malicious code having string Sx and allowed one mismatch. Because malicious code MC2 is the string Sx but including two mismatches, malicious code MC2 would be undetectable using the original virus definition file 112.

In notify host computer system user/administrator operation 216, a sample of malicious code MC2 is sent to a virus collection center for further analysis, e.g., to create a new updated virus definition file for the unknown malicious code.

Further, malicious code MC3 is another unknown virus variant. Specifically, malicious code MC3 is the string Sx but including four skips. As discussed above, mutated virus definition files 112A, 112B detect malicious code having string Sx and allow zero and four skips, respectively. Thus, malicious code MC3 is undetected using mutated virus definition file 112A, i.e., on the first host computer systems.

Accordingly, a virus writer who created and tested malicious code MC3 using the first host computer system including mutated virus definition file 112A will correctly determine that malicious code MC3 is undetectable on the first host computer system. Further, because malicious code MC3 is undetected on the first host computer system, the virus writer may draw the conclusion that malicious code MC3 will be undetectable on all host computer systems executing fuzzy scanning application 106. Thus, the virus writer releases malicious code MC3 into the wild fully expecting malicious code MC3 to become widespread.

However, as malicious code MC3 infects the second host computer system have mutated virus definition file 112B, malicious code MC3 is detected in malicious code detected check operation 208 on the second host computer system. Accordingly, flow moves to malicious code detectable without mutated properties of strings check operation 210.

In this example, a determination is made that malicious code MC3 would not be detectable absent the mutated properties of string Sx in malicious code detectable without mutated properties of strings check operation 210. Specifically, the original virus definition file 112 detected malicious code having string Sx and allowed for no skips. Because malicious code MC3 is the string Sx but including four skips, malicious code MC3 would be undetectable using the original virus definition file 112.

In notify host computer system user/administrator operation 216, a sample of malicious code MC3 is sent to a virus collection center for further analysis, e.g., to create a new updated virus definition file for the unknown malicious code.

In the above manner, new unknown virus variants, in this illustration malicious codes MC2, MC3, created by a virus writer on a first host computer system may not be detected by fuzzy scanning application 106 executing on the first host computer system. However, due to the randomness in string selection and string property mutation, fuzzy scanning application 106 executing on a second host computer system detects different unknown virus variants than the first host computer system.

Accordingly, malicious codes MC2, MC3 undetected by fuzzy scanning application 106 executing on the first host computer system are detected and collected by fuzzy scanning application 106 executing on a second host computer system when malicious codes MC2, MC3 are introduced on the second host computer system. In this manner, unknown virus variants are quickly detected and collected thus preventing the unknown virus variants from becoming widespread.

Referring again to FIG. 1, fuzzy scanning application 106 is in computer memory 114. As used herein, a computer memory refers to a volatile memory, a non-volatile memory, or a combination of the two.

Although fuzzy scanning application 106 is referred to as an application, this is illustrative only. Fuzzy scanning application 106 should be capable of being called from an application level or an operating system level anti-virus program. In one embodiment, an application is generally defined to be executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention may be carried out using any suitable hardware configuration involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium may belong to the computer system itself. However, the medium also may be removed from the computer system. For example, fuzzy scanning application 106, may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102A and/or server system 130 is a portable computer, a workstation, a two-way pager, a cellular telephone, a digital wireless telephone, a personal digital assistant, a server computer, an Internet appliance, or any other device that includes components that can execute the fuzzy scanning functionality in accordance with at least one of the embodiments as described herein. Similarly, in another embodiment, host computer system 102A and/or server system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the fuzzy scanning functionality in accordance with one embodiment of the present invention can be implemented in a wide variety of computer system configurations. In addition, the fuzzy scanning functionality could be stored as different modules in memories of different devices. For example, fuzzy scanning application 106 could initially be stored in server system 130, and then as necessary, a portion of fuzzy scanning application 106 could be transferred to host computer system 102A and executed on host computer system 102A. Consequently, part of the fuzzy scanning functionality would be executed on processor 134 of server system 130, and another part would be executed on processor 108 of host computer system 102A. In view of this disclosure, those of skill in the art can implement various embodiments of the present invention in a wide-variety of physical hardware configurations using an operating system and computer programming language of interest to the user.

In yet another embodiment, fuzzy scanning application 106 is stored in memory 136 of server system 130. Fuzzy scanning application 106 is transferred over network 124 to memory 114 in host computer system 102A. In this embodiment, network interface 138 and I/O interface 110 would include analog modems, digital modems, or a network interface card. If modems are used, network 124 includes a communications network, and fuzzy scanning application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   randomly selecting at least one string of a virus definition file used by a scanner to locate known viruses, said virus definition file comprising:
   a set of strings of said known viruses, said set of strings comprising said at least one string; and
   a set of properties associated with said set of strings of said known viruses, said properties defining known virus variants of said known viruses, said properties comprising a number of mismatches and skips allowed in said strings;
   randomly mutating properties of said at least one string to create a mutated virus definition file; and
   determining whether malicious code is detected using said mutated virus definition file.

2. The method of claim 1 wherein, upon a determination that malicious code is detected during said determining, said method further comprising determining whether said malicious code is detectable using said virus definition file.

3. The method of claim 2 wherein, upon a determination that said malicious code is not detectable using said virus definition file, said method further comprising submitting a sample of said malicious code to a virus collection center.

4. The method of claim 2 wherein, upon a determination that said malicious code is not detectable using said virus definition file, said method further comprising providing a notification that unknown malicious code is detected.

5. The method of claim 4 further comprising taking protective action to prevent damage to a host computer system comprising said malicious code.

6. The method of claim 2 wherein, upon a determination that said malicious code is detectable using said virus definition file, said method further comprising taking protective action to prevent damage to a host computer system comprising said malicious code.

7. The method of claim 1 wherein said set of properties of said virus definition file comprises a set of flags associated with said set of strings comprising at least one flag associated with said at least one string.

8. The method of claim 7 wherein said mutated virus definition file comprises said set of strings and a set of associated mutated flags comprising at least one mutated flag associated with said at least one string.

9. The method of claim 8 wherein said at least one mutated flag of said mutated virus definition file comprises a greater number of mismatches than said at least one flag of said virus definition file.

10. The method of claim 8 wherein said at least one mutated flag of said mutated virus definition file comprises a greater number of skips than said at least one flag of said virus definition file.

11. The method of claim 1 wherein said randomly mutating properties of said at least one string to create a mutated virus definition file comprises:
   mutating a flag associated with said at least one string; and
   determining whether said mutating carries an acceptable false positive risk.

12. The method of claim 11 wherein said mutating comprises adding at least one mismatch to said flag.

13. The method of claim 12 wherein said adding at least one mismatch comprises incrementing a mismatch value of said flag.

14. The method of claim 11 wherein said mutating comprises adding at least one skip to said flag.

15. The method of claim 14 wherein said adding at least one skip comprises incrementing a skip value of said flag.

16. The method of claim 11 wherein, upon a determination that said mutating does not carry an acceptable false positive risk during said determining whether said mutating carries an acceptable false positive risk, said method further comprising leaving said flag unmutated.

17. A method comprising:
   randomly mutating a virus definition file on a first host computer system to create a first mutated virus definition file, said virus definition file used by a scanner on said first host computer system to locate known viruses, said virus definition file comprising:
   a set of strings of said known viruses; and
   a set of properties associated with said set of strings of said known viruses, said properties defining known virus variants of said known viruses, said properties comprising a number of mismatches and skips allowed in said strings;
   randomly mutating said virus definition file on a second host computer system to create a second mutated virus definition file, said second mutated virus definition file being different than said first mutated virus definition file; and
   wherein said scanner on said first host computer system using said first mutated virus definition file and a scanner on said second host computer system using said second mutated virus definition file are used to detect malicious code.

18. The method of claim 17 wherein said scanner on said first host computer system using said first mutated virus definition file does not detected unknown malicious code and said scanner on said second host computer system using said second mutated virus definition file does detected said unknown malicious code.

19. A computer system comprising:
   a means for randomly selecting at least one string of a virus definition file used by a scanner to locate known viruses, said virus definition file comprising:
   a set of strings of said known viruses, said set of strings comprising said at least one string; and
   a set of properties associated with said set of strings of said known viruses, said properties defining known virus variants of said known viruses, said properties comprising a number of mismatches and skips allowed in said strings;
   a means for randomly mutating properties of said at least one string to create a mutated virus definition file; and
   a means for determining whether malicious code is detected using said mutated virus definition file.

20. A method comprising:
   randomly selecting strings of a virus definition file used by a scanner to locate known viruses, said strings comprising a first string, said virus definition file comprising:
   a set of strings of said known viruses, said set of strings comprising said first string; and a set of properties associated with said set of strings of said known viruses, said properties defining known virus variants of said known viruses, said properties comprising a number of mismatches and skips allowed in said strings; and randomly mutating properties of said strings to create a mutated virus definition file, said randomly mutating comprising:

selecting said first string;

mutating properties of said first string; and determining whether said first string is a last string of said strings; and determining whether malicious code is detected using said mutated virus definition file.

21. The method of claim 20 wherein, upon a determination that said first string is not said last string, said randomly mutating further comprising selecting a next string of said strings.

22. The method of claim 20 wherein said randomly mutating further comprises determining whether said mutating carries an acceptable false positive risk.

23. The method of claim 22 wherein, upon a determination that said mutating does not carry an acceptable false positive risk during said determining whether said mutating carries an acceptable false positive risk, said method further comprising leaving said properties of said first string unmutated.

24. A computer-program product comprising a computer readable medium containing computer code comprising:

a fuzzy scanning application for randomly selecting at least one string of a virus definition file used by a scanner to locate known viruses, said virus definition file comprising:

a set of strings of said known viruses, said set of strings comprising said at least one string; and a set of properties associated with said set of strings of said known viruses, said properties defining known virus variants of said known viruses, said properties comprising a number of mismatches and skips allowed in said strings;

said fuzzy scanning application further for randomly mutating properties of said at least one string to create a mutated virus definition file; and said fuzzy scanning application further for determining whether malicious code is detected using said mutated virus definition file.

25. The computer-program product of claim 24 wherein, upon a determination that malicious code is detected during said determining, said fuzzy scanning application is further for determining whether said malicious code is detectable using said virus definition file.

26. The computer-program product of claim 24 wherein, upon a determination that said malicious code is not detectable using said virus definition file, said fuzzy scanning application is further for submitting a sample of said malicious code to a virus collection center.

27. The computer-program product of claim 24 wherein, upon a determination that said malicious code is not detectable using said virus definition file, said fuzzy scanning application is further for providing a notification that unknown malicious code is detected.

* * * * *

UNITED STATES PATENT AND TRADEMARK OFFICE
CERTIFICATE OF CORRECTION

PATENT NO.         : 7,284,273 B1
APPLICATION NO. : 10/448567
DATED              : October 16, 2007
INVENTOR(S)        : Peter Szor It is certified that error appears in the above-identified patent and that said Letters Patent is hereby corrected as shown below:

In Column 14, Line 42, Claim 18, replace "detected" with --detect--; and
In Column 14, Line 44, Claim 18, replace "detected" with --detect--.

Signed and Sealed this

Fourteenth Day of October, 2008

JON W. DUDAS
*Director of the United States Patent and Trademark Office*